United States Patent [19]

Yamamoto et al.

[11] 4,421,324

[45] Dec. 20, 1983

[54] SHAFT SEAL DEVICE FOR SUBMERSIBLE MOTOR

[75] Inventors: Sakuei Yamamoto; Hiroshi Inao; Kiyonori Tokumitsu; Mitsuhiro Nishida; Sadahiro Kumamoto, all of Fukuoka, Japan

[73] Assignee: Mitsubishi Denki Kabushiki Kaisha, Japan

[21] Appl. No.: 492,673

[22] Filed: May 9, 1983

[30] Foreign Application Priority Data

May 14, 1982 [JP] Japan .............................. 57-71632[U]

[51] Int. Cl.³ .......................... F16J 15/32; F16J 15/40
[52] U.S. Cl. ......................................... 277/24; 277/59; 277/153
[58] Field of Search ................ 277/3, 24, 27, 59, 135, 277/152, 153, 237

[56] References Cited

U.S. PATENT DOCUMENTS

| 2,177,441 | 10/1939 | Pesarese | 277/152 |
| 3,099,454 | 7/1963 | Walinski | 277/152 X |
| 3,599,993 | 8/1971 | Eriksson | 277/59 |
| 4,000,930 | 1/1977 | Poncet et al. | 277/135 X |
| 4,165,085 | 8/1979 | Persson | 277/152 X |

FOREIGN PATENT DOCUMENTS 333339 8/1930 United Kingdom .................. 277/59

Primary Examiner—Robert S. Ward, Jr.
Attorney, Agent, or Firm—Leydig, Voit, Osann, Mayer and Holt, Ltd.

[57] ABSTRACT

A shaft seal device for a submersible motor, comprising a seal box which is provided at an end part of a case of the motor; a pair of lip type shaft sealing members which are disposed between an inner surface of said seal box and a rotary shaft of the motor and whose lips are arranged so as to inwardly face each other with a spacing therebetween; a lubricant which is stored in an interspace defined between said shaft sealing member; an auxiliary refuse remover which adjoins an outer side of one of said shaft sealing members and which is snugly inserted between the inner surface of an end part of said seal box and the rotary shaft of the motor, said auxiliary refuse remover being composed of a fitting and a soft material member which is received in said fitting and which is snugly positioned on the rotary shaft of the motor; and another refuse remover which is disposed so as to adjoin an outer side of said auxiliary refuse remover.

5 Claims, 1 Drawing Figure

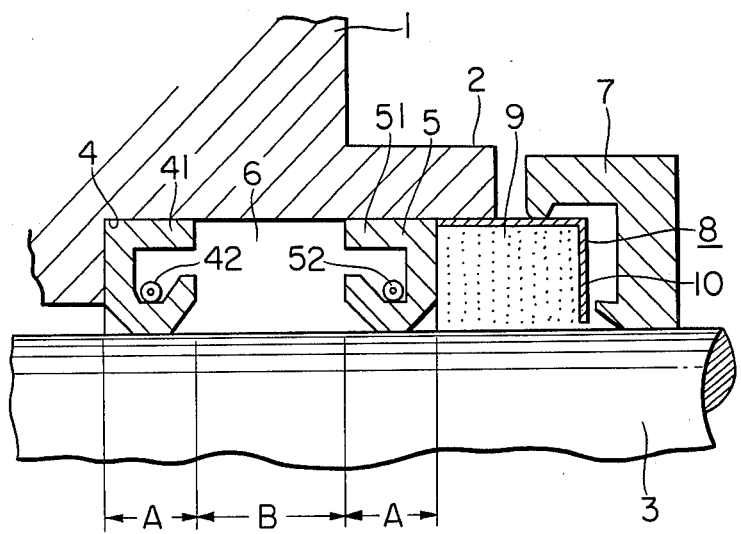

SHAFT SEAL DEVICE FOR SUBMERSIBLE MOTOR

BACKGROUND OF THE INVENTION

The present invention relates to a shaft seal device for a submersible motor.

Submersible motors have heretofore been furnished with a shaft seal device which employs lip type shaft sealing members. The shaft seal device, however, has had the disadvantage that it is unsatisfactory for maintaining a shaft sealing effect over a long term.

SUMMARY OF THE INVENTION

The present invention consists in providing a shaft seal device free from the disadvantage of the prior art mentioned above. More concretely, the shaft seal device according to the present invention includes a construction wherein a pair of lip type shaft sealing members are arranged so as to inwardly confront each other with an axial spacing therebetween and wherein an interspace defined between the pair of shaft sealing members is filled up with a lubricant.

BRIEF DESCRIPTION OF THE DRAWING

The single FIGURE is a front view, partly in section, showing a shaft seal device for a submersible motor in an embodiment of the present invention.

DESCRIPTION OF THE PREFERRED EMBODIMENT

The present invention concerns improvements in a shaft seal device for a submersible motor. An embodiment will now be described with reference to the drawing.

In the single FIGURE, numeral 1 designates the case of a submersible motor, numeral 2 a seal box which is formed unitarily with the case, and numeral 3 the rotary shaft of the motor. Numerals 4 and 5 denote a pair of lip type shaft sealing members which are so arranged that their respective lips 41 and 51 inwardly face each other. The shaft sealing members 4 and 5 are interposed between the seal box 2 and the rotary shaft 3, and they are so arranged as to define an interspace 6 of predetermined width extending in the axial direction of the rotary shaft 3. Shown at numerals 42 and 52 are clamp rings for clamping the sealing members 4 and 5 on the rotary shaft 3, respectively. The width A of each of the shaft sealing members 4 and 5 and the width B of the interspace 6 between both these members are held in the relationship of $B \geq A$. The interspace 6 is filled up with an oil or fat-based lubricant such as grease or polypropylene glycol. The lubricant may well be packed in the state in which a foamed urethane material is impregnated therewith. Numeral 7 indicates a refuse remover which prevents refuse in the water from entering the interior of the motor, while numeral 8 indicates an auxiliary refuse remover. The auxiliary refuse remover 8 is composed of a soft material member 9 which is snugly positioned on the rotary shaft 3, and a fitting 10 in which the soft material member 9 is received and which is snugly inserted in the inner periphery of the end part of the seal box 2. The soft material member 9 is formed of a polyester or polypropylene-based fibrous material.

In the shaft seal device of the present invention constructed as described above, the pair of lip type shaft sealing members are arranged with the respective lips facing inwards so that the lubricant therebetween will not leak out therefrom easily. Therefore, the liquid lubricant can be kept intact over a long period of time, thereby ensuring a long sealing lifetime. In this regard, when the foamed urethane material impregnated with the lubricant is used, the above effect can be rendered more effective. Moreover, since the pressure of the portion filled with the lubricant rises with a temperature rise during the operation of the motor, the difference of pressures inside and outside the motor case is reduced, resulting in an enhanced sealability. Moreover, even when an extraordinarily high pressure has developed inside or outside the motor case, the shaft sealing members do not shift, and the lips do not bite, so that the device is structurally stable. Furthermore, since the interspace is defined between the shaft sealing members, the set positions of the shaft sealing members need not be moved and readjusted at the maintenance and inspection of the motor. In addition, the auxiliary refuse remover prevents fine foreign matters from entering the motor, the foreign matters having been unremovable with the outer refuse remover, thereby preventing the shaft sealing members from being damaged and lengthening the lifetime of the shaft sealing members. The soft material member of the auxiliary refuse remover can be readily exchanged owing to its softness.

What is claimed is:

1. A shaft seal device for a submersible motor, comprising:

a seal box which is provided at an end part of a case of the motor;

a pair of lip type shaft sealing members which are disposed between an inner surface of said seal box and a rotary shaft of the motor and whose lips are arranged so as to inwardly face each other with a spacing therebetween;

a lubricant which is stored in an interspace defined between said shaft sealing members;

an auxiliary refuse remover which adjoins an outer side of one of said shaft sealing members and which is snugly inserted between the inner surface of an end part of said seal box and the rotary shaft of the motor;

said auxiliary refuse remover being composed of a fitting, and a soft material member which is received in said fitting and which is snugly positioned on the rotary shaft of the motor; and another refuse remover which is disposed so as to adjoin an outer side of said auxiliary refuse remover.

2. A shaft seal device for a submersible motor as defined in claim 1, wherein said lubricant is stored in said interspace in a state in which a foamed urethane material is impregnated therewith.

3. A shaft seal device for a submersible motor as defined in claim 1, wherein a length of said interspace is set greater than a length of the lip of said each shaft sealing member.

4. A shaft seal device for a submersible motor as defined in claim 1, wherein said soft material member of said auxiliary refuse remover is exchangeably received in said fitting.

5. A shaft seal device for a submersible motor as defined in claim 1, wherein said soft material member of said auxiliary refuse remover is formed of a polyester or polypropylene-based fibrous material.

* * * * *